United States Patent
Danielson et al.

(10) Patent No.: US 6,799,741 B2
(45) Date of Patent: Oct. 5, 2004

(54) EVACUATION SLIDE HAVING TRAPEZOIDAL OUTLINE

(75) Inventors: Leibert Danielson, Scottsdale, AZ (US); William J. Horvath, Chandler, AZ (US); Haiwen Meng, Tempe, AZ (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/177,190

(22) Filed: Jun. 21, 2002

(65) Prior Publication Data

US 2003/0234323 A1 Dec. 25, 2003

(51) Int. Cl.[7] ............................................. B64D 25/00
(52) U.S. Cl. ...................... 244/137.2; 244/905; 182/48
(58) Field of Search ............................ 244/905, 137.2; 193/25 B; 182/48

(56) References Cited

U.S. PATENT DOCUMENTS

| | | | |
|---|---|---|---|
| 3,771,749 A | * | 11/1973 | Smialowicz |
| 3,811,534 A | | 5/1974 | Fisher |
| 3,860,984 A | * | 1/1975 | Fisher |
| 3,973,645 A | * | 8/1976 | Dix et al. |
| 4,018,321 A | | 4/1977 | Fisher |
| 4,333,546 A | | 6/1982 | Fisher |
| 4,378,861 A | * | 4/1983 | Burrough et al. |
| 4,684,079 A | * | 8/1987 | Miller et al. |
| 5,102,070 A | | 4/1992 | Smialowicz et al. |
| 5,820,773 A | | 10/1998 | Hintzman et al. |
| 5,875,868 A | * | 3/1999 | Smialowicz et al. |

FOREIGN PATENT DOCUMENTS

EP 34357 * 8/1981 .............. 244/137.2

* cited by examiner

Primary Examiner—Tien Dinh
(74) Attorney, Agent, or Firm—Jerry Holden; John Titus

(57) ABSTRACT

An inflatable evacuation slide for emergency evacuation of an aircraft comprises a pair of main support tubes supporting a flexible sliding surface. The main support tubes taper from a widest point near the exit opening of the aircraft to a narrowest point at the foot end of the slide. This arrangement of main support tubes, together with the toe end transverse tube and the head end transverse tube, form a quasi-trapezoidal truss structure, which is inherently more stable than the rectangular slides of the prior art.

9 Claims, 3 Drawing Sheets

EVACUATION SLIDE HAVING TRAPEZOIDAL OUTLINE

BACKGROUND OF THE INVENTION

This invention relates to emergency evacuation equipment for aircraft, in particular, to inflatable aircraft evacuation slides.

The requirement for reliably evacuating airline passengers in the event of an emergency is well-known. Emergencies at take-off and landing often demand swift removal of the passengers from the aircraft because of potential for injuries from fire, explosion, and/or sinking in water. A conventional method of quickly evacuating a large number of passengers from an aircraft is to provide multiple emergency exits, each of which is equipped with an inflatable evacuation slide. Emergency evacuation slides must deploy reliably and remain in position notwithstanding the presence of severe crosswinds which tend to twist the slide and/or move the foot end of the slide out of position, rendering the slide unusable.

Various methods and apparatus have been proposed for improving the stability of inflatable evacuation slides during and after deployment when subjected to severe crosswinds. U.S. Pat. No. 5,820,773 to Hintzman, et al. teaches use of a support tube that prevents the evacuation slide from being blown underneath the aircraft during deployment. U.S. Pat. No. 5,102,070 to Smialowicz, et al. teaches use of an inflatable structure that extends into the slide enclosure to provide a rigid mount to help prevent the head end of the slide from twisting out of position. U.S. Pat. No. 3,811,534 to Fisher teaches an oil platform evacuation slide that uses a plurality of guy straps extending at angles outward from the foot end of the inflatable escape slide to head end attachments that are spaced apart substantially wider than the head end of the slide. The guy straps create a trapezoid truss arrangement, which provides for substantial resistance against deformation of the slide under windloads. Use of external guy straps to create a truss for securing the evacuation slide against lateral deformation under wind loads is very effective for evacuation slides for use with oil platforms and the like where the exposed guy straps are mounted to a stationary structure. Use of external guy straps on an aircraft evacuation slide, however, would be disfavored by most aircraft manufactures because of the need to provide concealed mounting points outside of the evacuation slide packboard enclosure. According, what is needed is an aircraft evacuation slide having the lateral stability inherent in a trapezoidal truss, without the need for externally mounted guy stays.

SUMMARY OF THE INVENTION

The present invention satisfies the foregoing need by providing an inflatable evacuation slide the main support tubes of which form a trapezoidal truss-like structure. According to one embodiment of the present invention the inflatable evacuation slide comprises a pair of main support tubes supporting a flexible sliding surface. The main support tubes taper from a widest point near the exit opening of the aircraft to a narrowest point at the foot end of the slide. This arrangement of main support tubes, together with the toe end transverse tube and the head end transverse tube, form a quasi-trapezoidal truss structure, which is inherently more stable than the rectangular slides of the prior art. The escape slide may extend normally outward from the aircraft fuselage such that the head end transverse tube and the toe end transverse tube are parallel, in which case the escape slide is a true trapezoid. Alternatively, the escape slide may extend out at an angle from the aircraft fuselage, in which case the head end tube and the toe end tube are not parallel and one of the main support tubes is longer than the other. In the latter case the escape slide is not a true trapezoid but is an irregular quadrilateral (or as used herein, a quasi-trapezoid). In either case, the non-parallel main support tubes that taper towards each other as they extend outward from the aircraft provide a highly stable structure not found in prior art rectangular evacuation slides.

BRIEF DESCRIPTION OF THE DRAWING

The present invention will be better understood from a reading of the following detailed description taken in conjunction with the accompanying drawing figures in which like references designate like elements and, in which.

DETAILED DESCRIPTION

Figure 1:
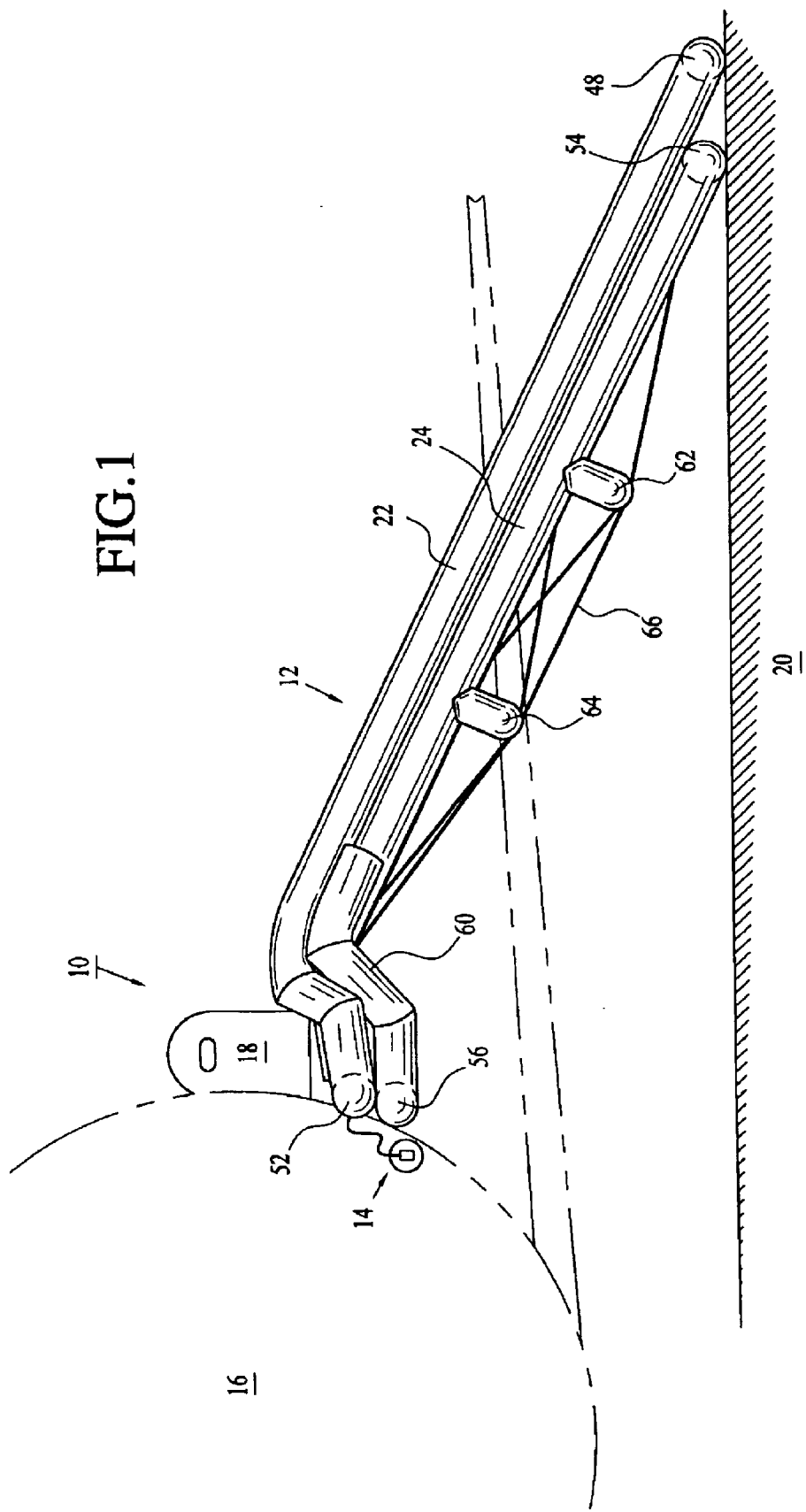
FIG. 1 is a side view of an evacuation slide incorporating features of the present invention.

The drawing figures are intended to illustrate the general manner of construction and are not necessary to scale. In the detailed description and in the figures, specific illustrative examples are shown and herein described in detail. It should be understood, however, that the drawing, the figures, and detailed description are not intended to limit the invention to the particular form disclosed, but are merely illustrative and intended to teach one of ordinary skill how to make and/or use the invention claimed herein and for setting forth the best mode for carrying out the invention.

FIG. 1 shows an inflatable evacuation slide system 10 incorporating features of the present invention. Slide system 10 includes an inflatable evacuation slide 12 and an inflator 14 which may be a conventional pyrotechnic, compressed gas, or hybrid inflator well-known in the art. Inflatable evacuation slide system 10 is stored in an undeployed condition in a packboard housing inside the fuselage of aircraft 16. In a deployed condition, inflatable evacuation slide 12 extends from a location proximal the egress opening 18 of aircraft 16 toward the ground level 20 or other lower supporting surface.

Figure 2:
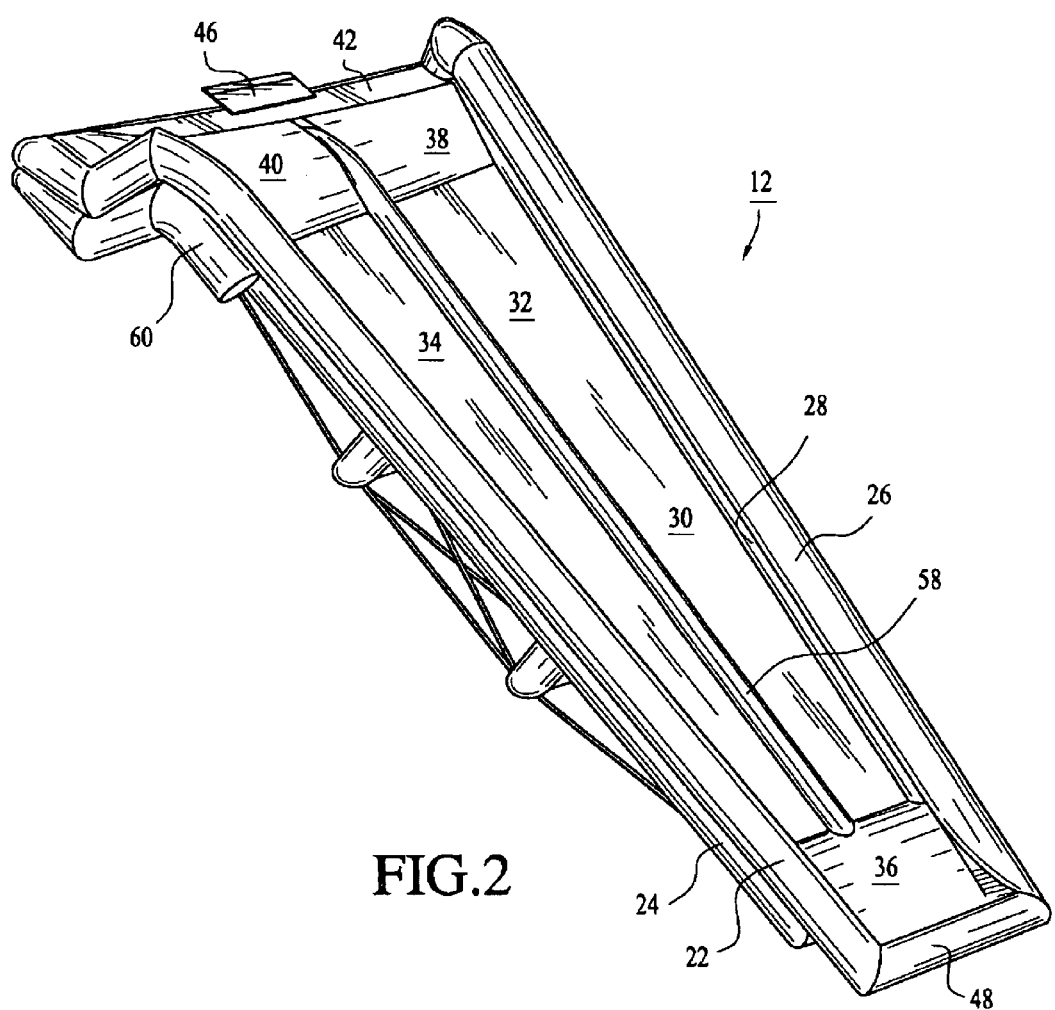
FIG. 2 is a perspective view of the evacuation slide of FIG. 1.
Figure 3:
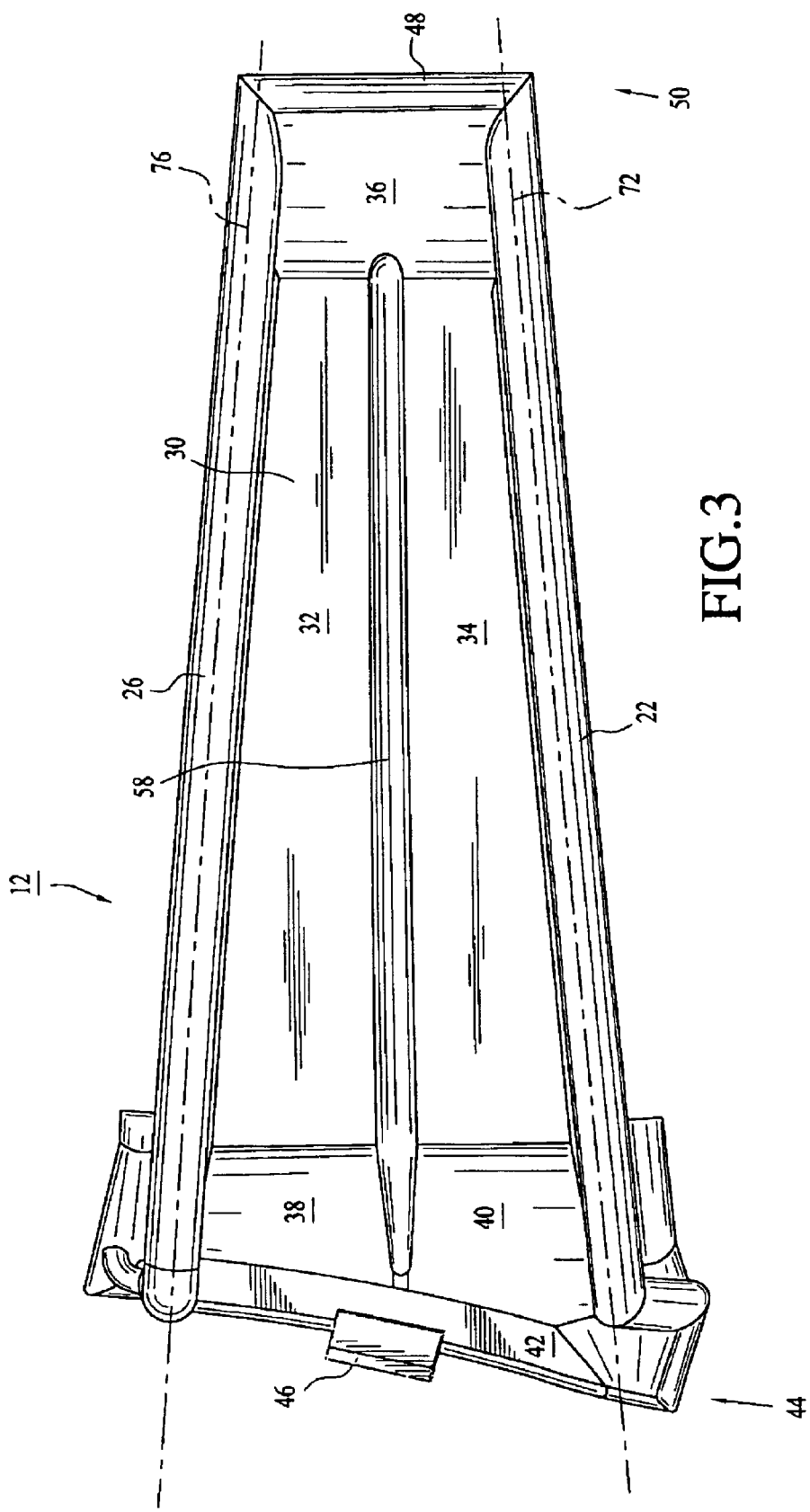
FIG. 3 is a top plan view of the evacuation slide of FIG. 1.

With reference to FIGS. 1, 2, and 3, inflatable evacuation slide 12 comprises upper main support tubes 22 and 26 and lower main support tubes 24 and 28 supporting a flexible sliding surface 30. Flexible sliding surface 30 is composed of a left main panel 32, a right main panel 34, a foot end panel 36, a left upper panel 38, a right upper panel 40 and a head end panel 42. The head end 44 of inflatable evacuation slide 12 is secured to aircraft 16 by a convention girt 46. Upper main support tubes 22 and 26 are maintained in a spaced-apart configuration by, in plan view, a substantially straight upper toe end transverse tube 48 located at the foot end 50 of inflatable evacuation slide 12 and an upper head end transverse tube 52 located at head end 44 of inflatable evacuation slide 12. As shown in FIG. 3, upper head end transverse tube 52 comprises in plan view a substantially straight inflatable tubular member the majority of the length of which abuts aircraft fuselage 16. By "substantially" straight, what is meant is that in plan view there are no pronounced angles (i.e. angles of 30 degrees or more).

Lower main support tubes 24 and 28 are similarly maintained in spaced-apart configuration by lower toe end transverse tube 54 at foot end 50 of inflatable evacuation slide 12 and lower head end transverse tube located at head end 44 of inflatable evacuation slide 12. A center support tube 58 bisects flexible sliding surface 30 to create two substantially parallel slides. A lateral support tube 60 provides additional support for head end 44 of inflatable evacuation slide 12.

With reference to FIGS. 1 and 2, additional support to prevent inflatable evacuation slide from buckling under heavy load is provided by a lower truss tube 62 and an upper truss tube 64 each of which comprises a U-shaped tube extending from lower main support tube 24 to lower main support tube 28. Optionally, lower truss tube 62 and upper truss tube 64 comprise E-shaped tubes interconnecting lower main support to tube 24, lower main support tube 28 and center support tube 58. A plurality of truss straps 66 act as tension members to support inflatable evacuation slide 12 against buckling under heavy load.

With reference in particular to FIGS. 2 and 3, upper main support tubes 22 and 26 each have in plan view an axial center line 72 and 76, respectively. As can be seen from FIG. 3, axial center line 72 and 76 taper towards each other moving from head end 44 to foot end 50 of inflatable evacuation slide 12, such that the foot end 50 of inflatable slide 12 is narrower then the head end 50. As is well known to structural engineers and bridge designers a trapezoid truss is inherently more rigid to side loading than is a rectangular truss. The inventors of the present invention recognized that similarly, an aircraft evacuation slide that in plan view had main support tubes that tapered together like a trapezoid would provide a substantially more rigid structure than could be achieved with parallel main support tubes.

It is not necessary that a slide constructed in accordance with the teachings of the present invention be a pure trapezoid as long as the main support tubes 22, 24, 26, 28 are non-parallel. For example, shown in FIG. 3, it may be advantageous to cant the evacuation slide so that it extends away from the aircraft at an angle rather than perpendicular to the aircraft fuselage. Canted slides may be advantageous in a jumbo aircraft having an upper deck exit door directly above a lower deck exit door. This is because canting the evacuation slide in opposite directions allows the foot ends of the upper and lower deck evacuation slides to extend to the ground level 20 at different locations. The tapered outline of the evacuation slide also provides for additional clearance between upper and lower deck slides.

Although certain illustrative embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to extent required by the appended claims and the rules and principals of applicable law.

What is claimed is:

1. An inflatable escape slide assembly adapted to be extended in a deployed condition from an elevated supporting surface to a lower supporting surface, said inflatable escape slide assembly comprising:
   a flexible panel defining a slide surface having first and second lateral edges and extending from a head end of said inflatable escape slide assembly to a foot end of said inflatable escape slide assembly;
   a first main support tube and a second main support tube, said first main support tube being attached to the first lateral edge of said flexible panel and said second main support tube being attached to the second lateral edge of said flexible panel for supporting said flexible panel between said first main support tube and said second main support tube;
   a head end transverse tube attached to said first and second main support tubes proximal said head end of said inflatable escape slide, said head end transverse tube comprising in plan view a substantially straight inflatable tubular member abutting said elevated supporting surface;
   said first and second main support tubes each comprising a substantially straight inflatable tubular member having a major longitudinal axis, said first and second main support tubes extending from a location proximal the head end of said inflatable escape slide assembly toward the foot end of said inflatable escape slide assembly;
   said first and second main support tubes being disposed in a spaced-apart configuration with the major longitudinal axes of said first and second main support tubes tapering towards each other in plan view from a widest point proximal the head end of said escape slide assembly to a narrowest point proximal the foot end of said escape slide assembly to form a substantially trapezoidal outline in plan view.

2. The inflatable escape slide assembly of claim 1, further comprising:
   a toe end transverse tube for maintaining the foot end of said first and second main support tubes in said spaced-apart configuration, said toe end transverse tube being shorter in length than said head end transverse tube.

3. The inflatable escape slide assembly of claim 1, wherein:
   said first and second main support tubes comprise cylindrical tubes of substantially constant circular cross section.

4. The inflatable escape slide assembly of claim 1, further comprising:
   a third main support tube and a fourth main support tube, said third main support tube being disposed below and attached to said first main support tube and said fourth main support tube being disposed below and attached to said second main support tube, said first, second, third and fourth main support tubes cooperating to provide strength and rigidity to said escape slide assembly under load.

5. The inflatable escape slide assembly of claim 1, wherein:
   said first main support tube is longer than said second main support tube such that said escape slide assembly in plan view is canted toward said second main support tube relative to the head end of said escape slide assembly to form a skewed trapezoidal outline in plan view.

6. An inflatable escape slide system adapted to extend from an elevated supporting surface to a lower supporting surface, said inflatable escape slide system comprising:
   an inflator for providing a source of pressurized gas; and
   an inflatable escape slide pneumatically connected to said inflator;
   said inflatable escape slide comprising a flexible panel defining a slide surface having first and second lateral edges and extending from a head end of said inflatable escape slide to a foot end of said inflatable escape slide;

a first main support tube and a second main support tube, said first and second main support tubes being attached to said first and second lateral edges of said flexible panel for supporting said flexible panel;

a head end transverse tube attached to said first and second main support tubes proximal said head end of said inflatable escape slide, said head end transverse tube comprising in plan view a substantially straight inflatable tubular member the majority of the length of which is adapted to abut said elevated supporting surface;

said first and second main support tubes each comprising a substantially straight cylindrical inflatable tubular member having in plan view a longitudinal axis, said first and second main support tubes extending from a location proximal the head end of the inflatable escape slide to a location proximal the foot end of the inflatable escape slide;

said first and second main support tubes being disposed in a spaced-apart configuration with the longitudinal axes of said first and second main support tubes tapering towards each other in plan view from a widest point proximal the head end of said escape slide to a narrowest point proximal the foot end of the escape slide, said longitudinal axes of said first and second main support tubes in plan view intersecting said head end transverse tube.

7. An inflatable escape slide system adapted to extend from an elevated supporting surface to a lower supporting surface, said inflatable escape slide system comprising:

an inflator for providing a source of pressurized gas; and an inflatable escape slide pneumatically connected to said inflator;

said inflatable escape slide comprising a flexible panel defining a slide surface having first and second lateral edges and extending from a head end of said inflatable escape slide to a foot end of said inflatable escape slide;

a first main support tube and a second main support tube, said first and second main support tubes being attached to said first and second lateral edges of said flexible panel for supporting said flexible panel;

said first and second main support tubes each comprising a substantially straight cylindrical inflatable tubular member having in plan view a longitudinal axis, said first and second main support tubes extending from a location proximal the head end of the inflatable escape slide to a location proximal the foot end of the inflatable escape slide;

a head end transverse tube attached to said first and second main support tubes proximal said head end of said inflatable escape slide, said head end transverse tube comprising in plan view a substantially straight inflatable tubular member having a longitudinal axis;

a toe end transverse tube attached to said first and second main support tubes proximal said toe end of said inflatable escape slide, said toe end transverse tube having a longitudinal axis;

said first and second main support tubes being disposed in a spaced-apart configuration with the longitudinal axes of said first and second main support tubes tapering towards each other in plan view from a widest point proximal the head end of said escape slide to a narrowest point proximal the foot end of the escape slide, said longitudinal axes of said first and second main support tubes intersecting said longitudinal axes of said head end transverse tube and said toe end transverse tube in plan view to form a trapezoid.

8. The inflatable escape slide assembly of claim 7, further comprising:

a third main support tube and a fourth main support tube, said third main support tube being disposed below and attached to said first main support tube and said fourth main support tube being disposed below and attached to said second main support tube, said first, second, third and fourth main support tubes cooperating to provide strength and rigidity to said escape slide assembly under load.

9. The inflatable escape slide assembly of claim 7, wherein:

said first main support tube is greater in length than said second main support tube such that said escape slide assembly in plan view is canted toward said second main support tube relative to the head end of said escape slide assembly to form a skewed trapezoid in plan view.

* * * * *